(12) United States Patent
Takagi et al.

(10) Patent No.: US 8,105,704 B2
(45) Date of Patent: Jan. 31, 2012

(54) NONVOLATILE PHASE CHANGE MAGNETIC MATERIAL, MANUFACTURING METHOD THEREOF, AND NONVOLATILE PHASE CHANGE MAGNETIC MEMORY USING THE SAME

(75) Inventors: Hidenori Takagi, Bunkyo-ku (JP); Tomohiro Takayama, Wako (JP)

(73) Assignee: Japan Science and Technology Agency, Saitama (JP)

( * ) Notice: Subject to any disclaimer, the term of this patent is extended or adjusted under 35 U.S.C. 154(b) by 638 days.

(21) Appl. No.: 11/661,318

(22) PCT Filed: Aug. 30, 2005

(86) PCT No.: PCT/JP2005/015808
§ 371 (c)(1), (2), (4) Date: Feb. 27, 2007

(87) PCT Pub. No.: WO2006/025413
PCT Pub. Date: Mar. 9, 2006

(65) Prior Publication Data
US 2008/0026257 A1    Jan. 31, 2008

(30) Foreign Application Priority Data
Aug. 30, 2004    (JP) .................................. 2004-251051

(51) Int. Cl.
*G11B 5/33* (2006.01)
(52) U.S. Cl. ..................................... 428/812; 428/836.1
(58) Field of Classification Search .................. 428/817, 428/824.3, 820.5, 821, 822
See application file for complete search history.

(56) References Cited

U.S. PATENT DOCUMENTS
5,464,523 A * 11/1995 Ramanarayanan et al. .. 204/424
2006/0231789 A1   10/2006 Yoshida et al.

FOREIGN PATENT DOCUMENTS
| JP | 48-39516 A | 6/1973 |
| JP | 48-73798 A | 10/1973 |
| JP | 1-232550 A | 9/1989 |
| JP | 6-162563 A | 6/1994 |

(Continued)

OTHER PUBLICATIONS
Machine Translation of Hiroshi et al. (JP 2004-335623).*

(Continued)

*Primary Examiner* — Holly Rickman
*Assistant Examiner* — Linda Chau
(74) *Attorney, Agent, or Firm* — Chen Yoshimura LLP (57) ABSTRACT

A memory is provided that is improved in cost, life, energy consumption and recording density over existing optical disks and hard disks and operates under novel principles, as well as its manufacturing method. A nonvolatile phase change magnetic memory comprises a substrate and a film loaded on the substrate, which film is of a crystalline transition metal chalcogenide compound that in composition is deficient in transition metal from its stoichiometric ratio composition and expressed by formula: $A_yX$ where A is a transition metal, X is a chalcogen element and $0<y<1$, and in which film a minute portion subjected to a temperature history is made to form a ferromagnetic phase (1) or an antiferromagnetic phase (7) in which holes (4) for transition metal (2) are orderly or disorderly arranged and is stored with information as a magnetization based on the ferromagnetic phase (1) or antiferromagnetic phase (7).

5 Claims, 7 Drawing Sheets

FOREIGN PATENT DOCUMENTS

| | | |
|---|---|---|
| JP | 2002-255698 A | 9/2002 |
| JP | 2004-335623 A | 11/2004 |

OTHER PUBLICATIONS

English Translation of Kirino et al. (PTO 09-6330) (1989).*
Moldenhauer, W. et al. (Physical Properties of Nonstoichiometric Iron Sulfide Fe1-xS near the alpha-Phase Transition, 1976, Central Institute for Solid State Physics and Material Research, Academy of Sciences of the GDR, Dreaden, phys. state. sol. (a) 84, p. 565-571).*
International Search Report (PCT/ISA/210) in PCT/JP2005/15808.
Written Opinion (PCT/ISA/237) in PCT/JP2005/15808.
International Preliminary Examination Report (PCT/IPEA/409) & its Annexes in PCT/JP2005/15808.
English-language translation of Applicants' arguments in submitting Claim Amendments in PCT/JP2005/15808(the above Annexes).
Wang et al., "A review on the mineral chemistry of the non-stoichiometric iron sulphide, Fe1-xS( $0 \leqq x \leqq .125$): polymorphs, phase relations and transitions, electronic and magnetic structures", Phase Transitions, vol. 78, Nos. 7-8, Sep. 2005, pp. 547-567.

* cited by examiner

Temperature History (a)

NONVOLATILE PHASE CHANGE MAGNETIC MATERIAL, MANUFACTURING METHOD THEREOF, AND NONVOLATILE PHASE CHANGE MAGNETIC MEMORY USING THE SAME

TECHNICAL FIELD

The present invention relates to a nonvolatile phase change magnetic material based on a newly discovered phenomenon and also to a manufacturing method thereof, and a nonvolatile phase change magnetic memory using the same.

BACKGROUND ART

Developments in recent years of digitization techniques are so remarkable that it becomes possible for image signals corresponding to a movie in its entirety to be recorded as digital information in a single optical disk. One of reasons why it becomes possible to store such a massive amount of digital information in a single optical disk can be shown as a progress of optical disk recording media. Optical disks include magneto optic recording and phase change types both of which use an amorphous thin film low in phase transformation temperature, which consists of a compound of rare earth and transition metal elements, to make high density and high efficiency recording possible (see Nonpatent Reference 1).

However, there is the problem that rare earth elements are low in ore reserves and therefore high in cost. There is also the problem that an amorphous thin film is complex in composition and, if it is continued that data are repeatedly written and erased on it over a prolonged time period, tends to change its composition so that it can no longer allow its writing and erasing. The film has further the problem that in its magnetizing it needs to be made amorphous upon rearranging the crystallographic structure over its entire material in a recording region and entails large amount of energy consumed to this end.

Further, in a process of magnetically recording on a magnetic tape or a hard disk where several magnetic fine particles constitute a storage area, the recording density is limited depending on the size of the magnetic fine particles. There is a limit in making the particles finer and it is difficult to increase the recording density higher than the existing limit.

Moreover, where there is no end to the demands for the rise in recording density, attempts to utilize near-field optical techniques so to record beyond the diffraction limit of read and write laser light have begun (see Nonpatent Reference 2). To enhance the recording density, however, it is indispensable and essential not only to improve the recording method but also to develop a material based on new operating principles that can withstand the recording density.

Furthermore, it is possible to utilize nonvolatile phase change magnetic materials not only for memory applications but also, e.g., as a material for forming magnetic latent images in a copying machine using magnetic toner as ink. For example, a nonvolatile phase change magnetic material can be applied to a drum surface, which is irradiated with a laser beam to cause a nonvolatile phase change and form a magnetic latent image to which the magnetic toner is adhered for printing on paper and thereby copying. While a ferromagnetic film has hitherto been used as the magnetic latent image material for magnetic recording to form magnetic latent images by magnetizing the ferromagnetic film with a magnetic head, the recording density is limited by the size of magnetic fine particles and the resolution of images is now approaching its limit and, as a result, a magnetic material capable of recording a image of high definition is being sought.

REFERENCE CITED

Nonpatent Reference 1: Mamizu Harada "All in New Digital Imaging Techniques", Denpa Shinbunsha, 1st ed., page 163, Oct. 31, 2001

Nonpatent Reference 2: Mamizu Harada "All in New Digital Imaging Techniques", Denpa Shinbunsha, 1st ed., page 166, Oct. 31, 2001

Nonpatent Reference 3: Atsushi Okasaki, "The Superstructure of Iron Selenide $Fe_7Se_8$" Journal of the Physical Society of Japan, vol. 16, No. 6, p 1162 (1961)

DISCLOSURE OF THE INVENTION

Problems to be Solved by the Invention

As will be appreciated from the foregoing discussion, there is sought a nonvolatile phase change magnetic material that is improved in cost, service life, energy consumption and recording density over, and that is capable of forming magnetic latent images with higher definition than, e.g., the conventional optical disk and hard disk materials, as well as a method of making the improved magnetic material and a nonvolatile phase change magnetic memory using the same.

The present inventors have discovered the phenomenon in a crystalline transition metal chalcogenide compound which in composition is deficient in transition metal from its stoichiometric ratio composition that both a ferromagnetic and an antiferromagnetic phase can be reversibly formed of the same material by types of the temperature history applied thereto, and have arrived at the present invention.

In order to solve the problems mentioned above, the present inventors contemplate providing a nonvolatile phase change magnetic material that is improved in cost, service life, energy consumption and recording density over, and that is capable of forming magnetic latent images with higher definition than, e.g., the conventional optical disk and hard disk materials, as well as a method of manufacturing the improved magnetic material and a nonvolatile phase change magnetic memory using such a nonvolatile phase change magnetic material.

[Means for Solving the Problems]

In order to achieve the object mentioned above, there is provided in accordance with the present invention a nonvolatile phase change magnetic material, characterized in that it is of a crystalline transition metal chalcogenide compound which in composition is deficient in transition metal from its stoichiometric ratio composition and expressed by formula: $A_yX$ where A is a transition metal, X is a chalcogen element and $0<y<1$.

Said crystalline transition metal chalcogenide compound is such that spins of transition metal atoms are coupled together ferromagnetically in a crystallographic c-plane and antiferromagnetically between c-planes and has an ordered structure that holes as a deficiency of the above-mentioned transition metal are distributed such that the c-plane in which the holes are present and the c-plane in which the holes are absent are alternately laid one on another whereby its crystal as a whole exhibits ferromagnetic properties.

Said crystalline transition metal chalcogenide compound by applying a first temperature history thereto is transformed from the ordered structure of hole distribution into a disordered structure that holes are distributed disorderly in each of such c-planes whereby the crystal as a whole exhibits antiferromagnetic properties.

Said crystalline transition metal chalcogenide compound having the first temperature history applied thereto is transformed, by applying a second temperature history thereto, from the disordered structure of hole distribution to restore said ordered structure of hole distribution whereby the crystal as a whole exhibits the ferromagnetic properties.

Said first temperature history may comprise heating the crystalline compound to a temperature at which the ordered structure of hole distribution can vanish, followed by its rapid cooling.

The one of such second temperature histories may comprise heating the crystalline compound to a temperature at which the holes can diffuse and the ordered structure of hole distribution can be maintained, followed by its rapid or slow cooling. The other of such second temperature histories may comprise heating the crystalline compound to a temperature at which the ordered structure of hole distribution can vanish, followed by its slow cooling.

Said crystalline transition metal chalcogenide compound preferably has a composition expressed by formula: $Fe_yS$ where $0.875<y<0.93$.

There is also provided in accordance with the present invention a method of manufacturing a nonvolatile phase change magnetic material, characterized by depositing the transition metal and the chalcogenide element in selected proportions on a substrate heated to a selected temperature in a vapor phase growth, dry depositing or sputtering process. Alternatively, it is characterized by preparing a powdery mixture of the transition metal and the chalcogenide element mixed in selected proportions, heating the powdery mixture at a selected temperature to form a sintered body, and applying the sintered body on a substrate.

There is further provided in accordance with the present invention a nonvolatile phase change magnetic memory, characterized in that it comprises: a substrate; and a film loaded on said substrate, which film is of a nonvolatile phase change magnetic material of a crystalline transition metal chalcogenide compound that in composition is deficient in transition metal from its stoichiometric ratio composition.

One form of implementation of said nonvolatile phase change magnetic memory is characterized in that said film of the crystalline transition metal chalcogenide compound is a ferromagnetic film formed by applying said one or other second temperature history thereto; said ferromagnetic film has a minute portion irradiated with a laser light pulse bringing about said first temperature history to make its antiferromagnetic phase and to erase its magnetization, thereby writing information thereat; said minute portion is irradiated with laser light to read the information by detecting Kerr effect or Faraday effect of light reflected from the laser light based on a magnetization thereof or by detecting the magnetization through a magnetoresistance thereof; and said minute portion is irradiated with a laser light pulse bringing about said one or other second temperature history to make its ferromagnetic phase and to generate its magnetization, thereby erasing the information recorded.

The other form of implementation of said nonvolatile phase change magnetic memory is characterized in that said film of the crystalline transition metal chalcogenide compound is an antiferromagnetic film formed by applying said first temperature history thereto; said antiferromagnetic film has a minute portion irradiated with a laser light pulse bringing about said one or other second temperature history to make its ferromagnetic phase and to generate its magnetization, thereby writing information thereat; said minute portion is irradiated with laser light to read the information by detecting Kerr effect or Faraday effect of light reflected from the laser light based on a magnetization thereof or by detecting the magnetization through a magnetoresistance thereof; and said minute portion is irradiated with a laser light pulse bringing about said first temperature history to make its antiferromagnetic phase and to erase its magnetization, thereby erasing the information recorded.

Said crystalline transition metal chalcogenide compound preferably is a film having a composition expressed by formula: $Fe_yS$ where $0.875<y<0.93$.

EFFECTS OF THE INVENTION

According to a memory of the present invention, there is no need to use a rare earth element as is required in magneto optical disks, allowing a reduced cost. The composition is not complex as of an amorphous film of magneto optical disks, ensuring a prolonged service life. There is no need as in an amorphous film of magneto optical disks to make it amorphous upon rearranging the crystallographic structure over its entire material in a recording region; it only requires the distribution of holes to be altered in recording, entailing a low consumption of power.

With the memory of the present invention magnetization depends on the state of arrangement of holes in an atomic scale and since it is then in principle possible to write and erase even in a minute region as small as simple lattices, it becomes possible to record at a density higher than with the prior art and that no need for an apparatus for applying a magnetic field makes the device structure extremely simple.

DESCRIPTION OF REFERENCE CHARACTERS

1 Transition metal chalcogenide
2 Transition metal (atom)

3 c-plane
4 Hole
5 Defect layer
6 Filled layer
7 Transition metal chalcogenide with holes disorderly arranged

BEST MODE FOR CARRYING OUT THE INVENTION

Hereinafter, the present invention will be described in detail with respect to certain preferred forms of implementation thereof illustrated in the drawing figures.

Figure 1:
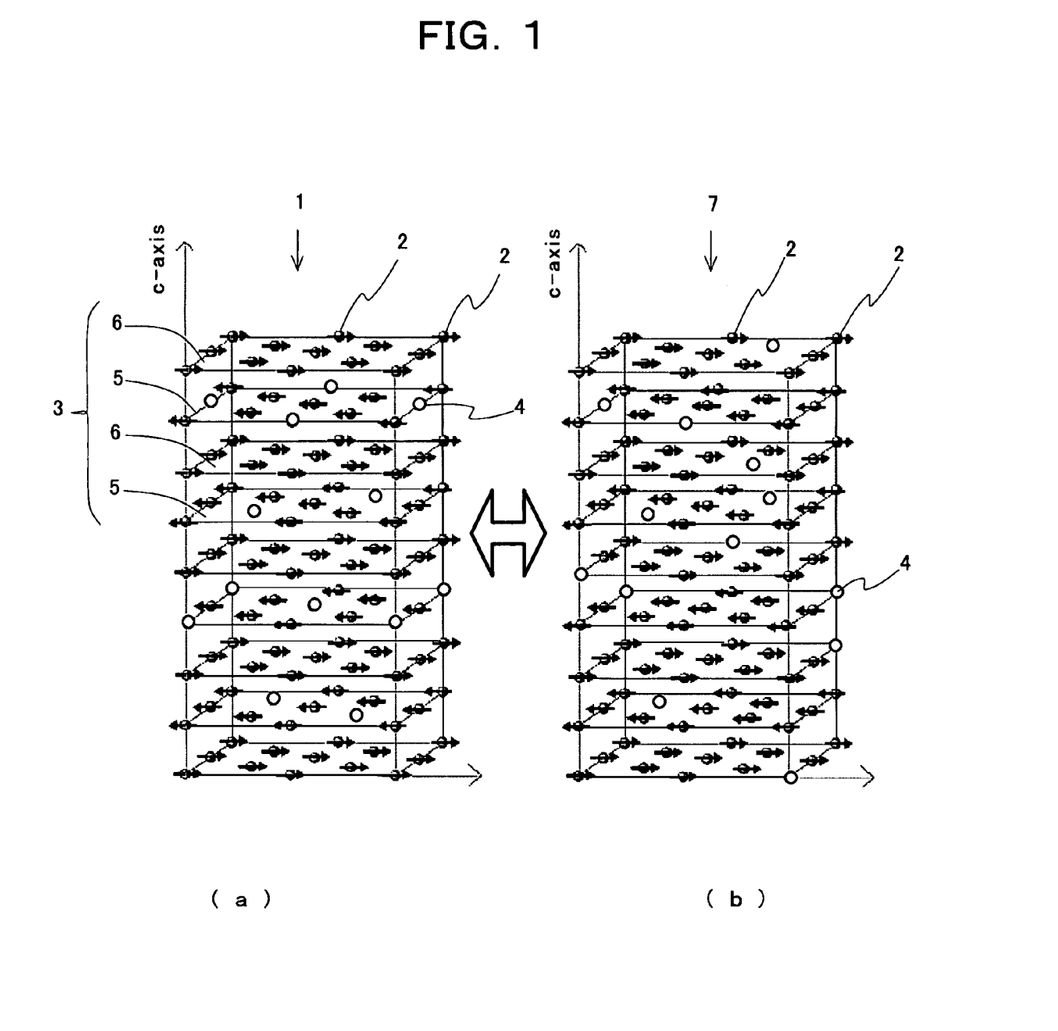
FIG. 1 is a conceptual view illustrating both ferromagnetic and antiferromagnetic properties of a nonvolatile phase change magnetic material according to the present invention.

FIG. 1 is a conceptual view illustrating both ferromagnetic and antiferromagnetic properties of a nonvolatile phase change magnetic material according to the present invention. The Figure shows where the transition metal chalcogenide crystallographic structure is a NiAs type crystallographic structure wherein the black circles (●) designate transition metal atoms, the arrows marked over the black circles indicate spins of transition metal atoms attributed to spins of electrons localized at transition metal atoms, and the white circles (○) denote holes of transition metal atoms. The frame of each of the parallelograms shown designates a crystallographic c-plane which is perpendicular to the c-axis.

The transition metal chalcogenide 1 is such that spins of transition metal atoms 2 are coupled together ferromagnetically in a crystallographic c-plane 3 and antiferromagnetically between c-planes 3. Thus, with its crystal considered as a whole, it would exhibit antiferromagnetism. The transition metal chalcogenide 1 has a nature that it tends to be deficient in transition metal 2. In the present invention, use is made of a transition metal chalcogenide that is deficient in transition metal 2. FIG. 1(a) shows a structure of a crystalline transition metal chalcogenide so composed as to be deficient in transition metal 2 and grown under a condition near a thermal equilibrium condition. Although if the amount of deficiency of transition metal is extremely small, holes for transition metal are disorderly arranged, it is known that in a composition in which the amount of deficiency of transition metal is greater than with a certain critical composition, holes 4 produced at positions where transition metal atoms 2 are lacking form an orderly arrangement (see Nonpatent Reference 3). Such an orderly arrangement of holes is such that holes 4 occupy layers in every other c-plane so that a defect layer 5 in which holes 4 are present and a filled layer 6 in which holes are absent are alternately laid one on another in the direction of c-axis. To wit, seen in terms of a magnetic structure, with the defect layer 5 and the filled layer 6 taken as antiferromagnetic magnetic sublattices, it follows that holes 4 are present only in one of the antiferromagnetic magnetic sublattices. In such a state of arrangement of holes 4 where there is a difference in magnitude of spontaneous magnetization between the two antiferromagnetic magnetic sublattices 5 and 6, there comes to be exhibited spontaneous magnetization.

Also, such a state of arrangement of holes can be controlled by a temperature history. To wit, the transition metal chalcogenide 1 in which a defect layer 5 wherein the holes 4 are present and a filled layer 6 wherein the holes are absent are alternately laid one on top of another in the direction of c-axis as shown in FIG. 1(a) is heated to a temperature at which the holes 4 become arranged disorderly followed and is rapidly quenched from that temperature to obtain a transition metal chalcogenide 7 in which the holes 4 are arranged disorderly as shown in FIG. 1(b). In the state where the holes 4 are arranged randomly, the two magnetic sublattices 5 and 6 are equal to each other in magnitude of spontaneous magnetization so that the crystallographic structure as a whole exhibits antiferromagnetism and creates no spontaneous magnetization. Thus, in a transition metal chalcogenide, two distinct phases different in magnetic properties can be created by controlling states that holes are arranged by applying temperature history thereto.

A memory according to the present invention is characterized in that a substrate is loaded with said transition metal chalcogenide in the form of a film, and has two possible operating modes as mentioned below.

The first operating mode uses the film that is made to develop its ferromagnetic phase; to this end, the film is heated to a temperature at which the structure that holes are distributed orderly can vanish and then is slowly cooled, or heated to a temperature at which holes can diffuse and the structure that holes are distributed orderly can be maintained and is rapidly or slowly cooled, to develop the ferromagnetic phase. For the write operation, the film formed with the ferromagnetic phase is irradiated with a single-shot laser light pulse as has conventionally been used, e.g., in magneto optical disks on a minute region thereof for heating to a temperature at which the ordered structure of hole distribution can vanish followed by its rapid cooling so that the minute region is converted to its antiferromagnetic phase, vanishing its spontaneous magnetization, which is rendered ready for writing with information.

In the readout operation, a minute region of the film is irradiated with readout laser light as has conventionally been used, e.g., in magneto optical disks to read out information by detecting Kerr or Faraday effect of reflected light based on a magnetization of the minute region or detecting the magnetization of the minute region through a magnetoresistance effect.

Also, information stored can be erased, by irradiating a minute region of the film with a laser light pulse as has conventionally been used, e.g., in magneto optical disks for heating to a temperature at which holes can diffuse and at which to maintain the ordered structure of hole distribution followed by its rapid cooling, or irradiation in a time sequence with a plurality of laser light pulses for heating to a temperature at which to vanish the ordered structure of hole distribution followed by slow cooling so that the minute region is converted to the ferromagnetic phase, generating spontaneous magnetization, to erase the information stored.

The second operating mode uses the film that is made to form its antiferromagnetic phase; to this end, the film is heated to a temperature at which the ordered structure of hole distribution can vanish and then is rapidly cooled to develop the antiferromagnetic phase. For the write operation, the film formed with the antiferromagnetic phase is irradiated with a laser light pulse as has conventionally been used, e.g., in magneto optical disks on a minute region thereof for heating to a temperature at which the holes can diffuse followed by its rapid or slow cooling, or for heating to a temperature at which to vanish the ordered structure of hole distribution followed by its slow cooling, so that the minute region is converted to its ferromagnetic phase, generating its spontaneous magnetization, which is rendered ready for writing with information.

In the readout operation, a minute region of the film is irradiated with readout laser light as has conventionally been used, e.g., in magneto optical disks to read out information by detecting Kerr or Faraday effect of reflected light based on a magnetization of the minute region or detecting the magnetization of the minute region through a magnetoresistance effect.

Also, the information stored can be erased, by irradiating a minute region of the film with a single-shot laser light pulse for heating to a temperature at which to vanish the ordered structure of hole distribution followed by rapid cooling so that the minute region is converted to the antiferromagnetic phase, vanishing spontaneous magnetization, to erase the information stored.

The transition metal chalcogenide mentioned above can be made by causing a transition metal and a chalcogenide element in a selected ratio to be deposited on a substrate heated to a selected temperature, using a vapor phase growth process such as CVD (chemical vapor deposition), dry deposition such as electron beam evaporation or laser ablation, or sputtering process known as ever.

It can also be made that by mixing powders together of a transition metal and a chalcogenide element in selected proportions, forming the powdery mixture at a selected temperature into a sintered body, pulverizing the sintered body into particles and applying the particles together with an appropriate dispersing agent onto a substrate.

A nonvolatile phase change magnetic memory according to the present invention that requires no rare earth element unlike magneto optical disks and hence is low in cost. Also, it is not complex in composition unlike amorphous films in magneto optical disks and hence is long in service life. Further, unlike amorphous films in magneto optical disks, it for recording need not be made amorphous upon rearranging the crystallographic structure over its entire material in a recording region and, requiring only changes in hole distribution and no substantial change in structure, entails only an extremely low amount of power consumption. Also, with the transition metal chalcogenide magnetized depending on the state of arrangement of holes, namely upon atomic scale and since it is then in principle possible to write and erase even in a minute region as small as simple lattices, the memory of the invention becomes capable of recording at a density higher than with the prior art. Further, according to modes 1 and 2 in operation, no magnetic field is required, so the device structure becomes extremely simple.

EXAMPLE 1

Mention is made of a specific example.

For the transition metal chalcogenide, use was made of a single crystal of composition $Fe_yS$. $Fe_yS$ was prepared by a chemical vapor transport reaction method. The polycrystalline raw material specimen together with a transporting agent ($FeI_2$) was charged in vacuum into a quartz tube and bred in an electric furnace in which both ends of the quartz tube are designed to have a temperature difference. The raw material specimen was placed at one end of the quartz tube as the raw material side with its other end acting as a crystal breeding side. Maintaining the raw material and crystal breeding sides at temperatures of 700° C. and 600° C., respectively, causes the raw material specimen and the transporting agent to react and produce a gas phase at the raw material side and the gas phase to move towards the crystal breeding side where the gas phase is decomposed into a crystal, again of the composition of the raw material specimen together with the transporting agent. The crystal was thus formed.

Figure 2:
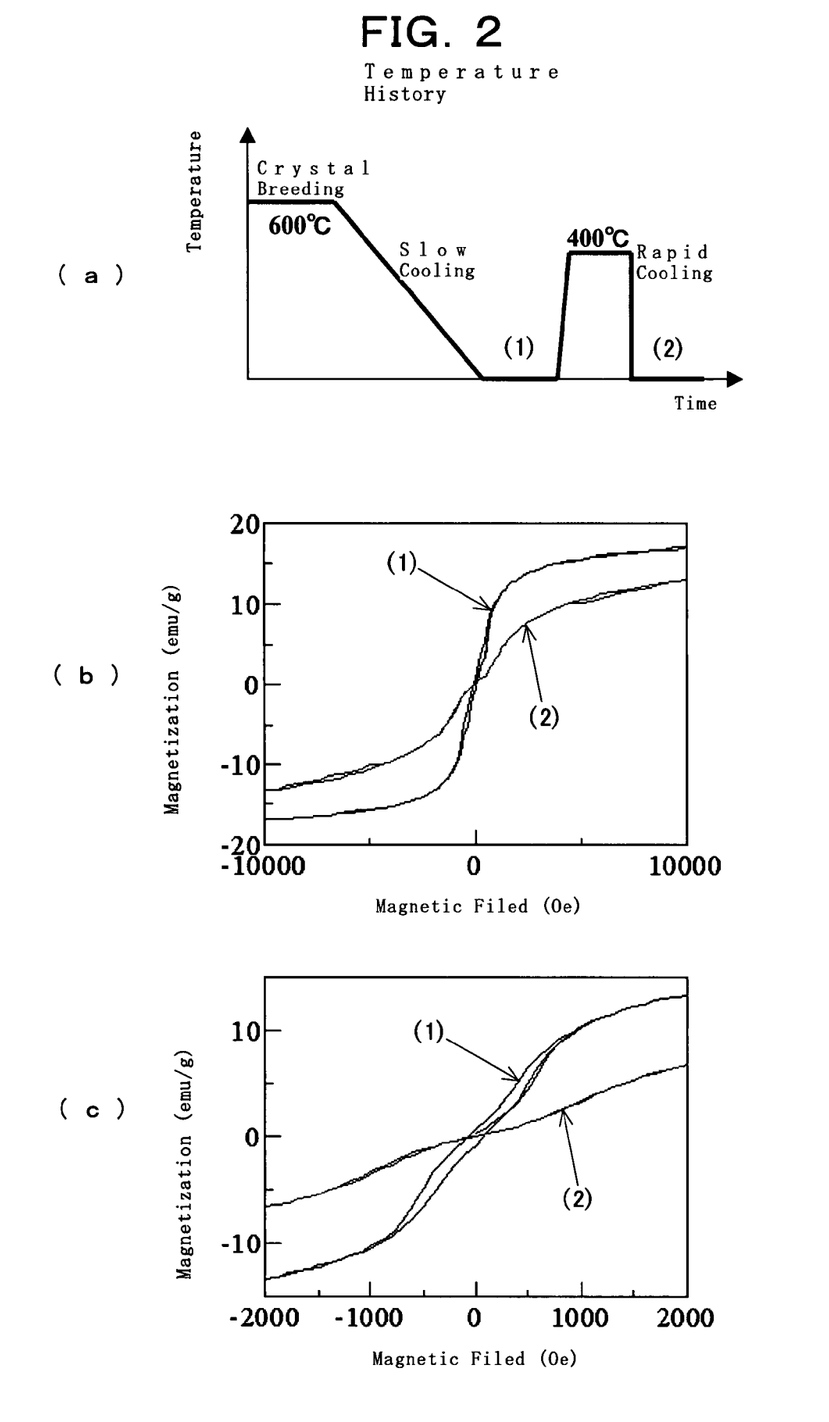
FIG. 2 is a diagram illustrating changes in magnetizing properties of $Fe_{0.92}S$ single crystal as a nonvolatile phase change magnetic material according to the present invention by a temperature history applied thereto.

FIG. 2 shows in a diagram and graphs changes in magnetizing properties of the $Fe_{0.92}S$ single crystal as a nonvolatile phase change magnetic material of the present invention by temperature histories applied thereto. FIG. 2(a) is the diagram illustrating the temperature histories in which the abscissa axis represents time and the ordinate axis represents temperature of the specimen. In the diagram, a straight line represented by 600° C., which extends horizontally from time 0, corresponds to the crystal breeding of the specimen, a subsequent straight line of negative gradient indicates slow cooling of the specimen towards room temperature after the crystal breeding, a subsequent straight line indicated by (1) on the time axis indicates the specimen at the room temperature after the slow cooling, a subsequent straight line vertical and a straight line represented by 400° C. indicate heating of the specimen to the temperature at which the holes are arranged disorderly, a subsequent vertical straight line indicates rapid quenching to room temperature from the temperature at which the holes in the specimen are arranged disorderly, and further a subsequent straight line indicated by (2) on the time axis indicates the specimen at the room temperature after the rapid cooling. Here, the slow cooling was done at a rate of cooling from 600° C. to room temperature for a time period of 5 hours.

FIG. 2(b) shows magnetizing properties of the specimen (1) after the slow cooling and of the specimen (2) after the rapid cooling in which the abscissa axis represents magnetic field strength and the ordinate axis represents magnetization. FIG. 2(c) is a graph showing the magnetizing properties enlarged in the vicinity of the strength of applied magnetic field of zero. Here, the magnetic field was applied in a direction in a c-plane and the measurements were all taken at room temperature (300 K). From the graphs, it is seen that the specimen (2) is lower in magnetization than the specimen (1). Noteworthy here is that a hysteresis is found in the magnetization curve of specimen (1) which has a finite spontaneous magnetization under the magnetic field of zero while no hysteresis is found in the specimen (2) whose magnetization becomes zero under the magnetic field of zero. From this, it is seen that there can be distinctively created the phase exhibiting and the phase not exhibiting spontaneous magnetization by applying different temperature histories thereto in the material.

Mention is next made of a polycrystalline transition metal chalcogenide.

For the transition metal chalcogenide, use was made of a polycrystal of composition $Fe_{0.92}S$. $Fe_{0.92}S$ was a sintered body prepared from a mixture of Fe and S powders mixed at a selected ratio of components which was charged in vacuum into a quartz tube and then heated at a temperature of 900° C.

Figure 3:
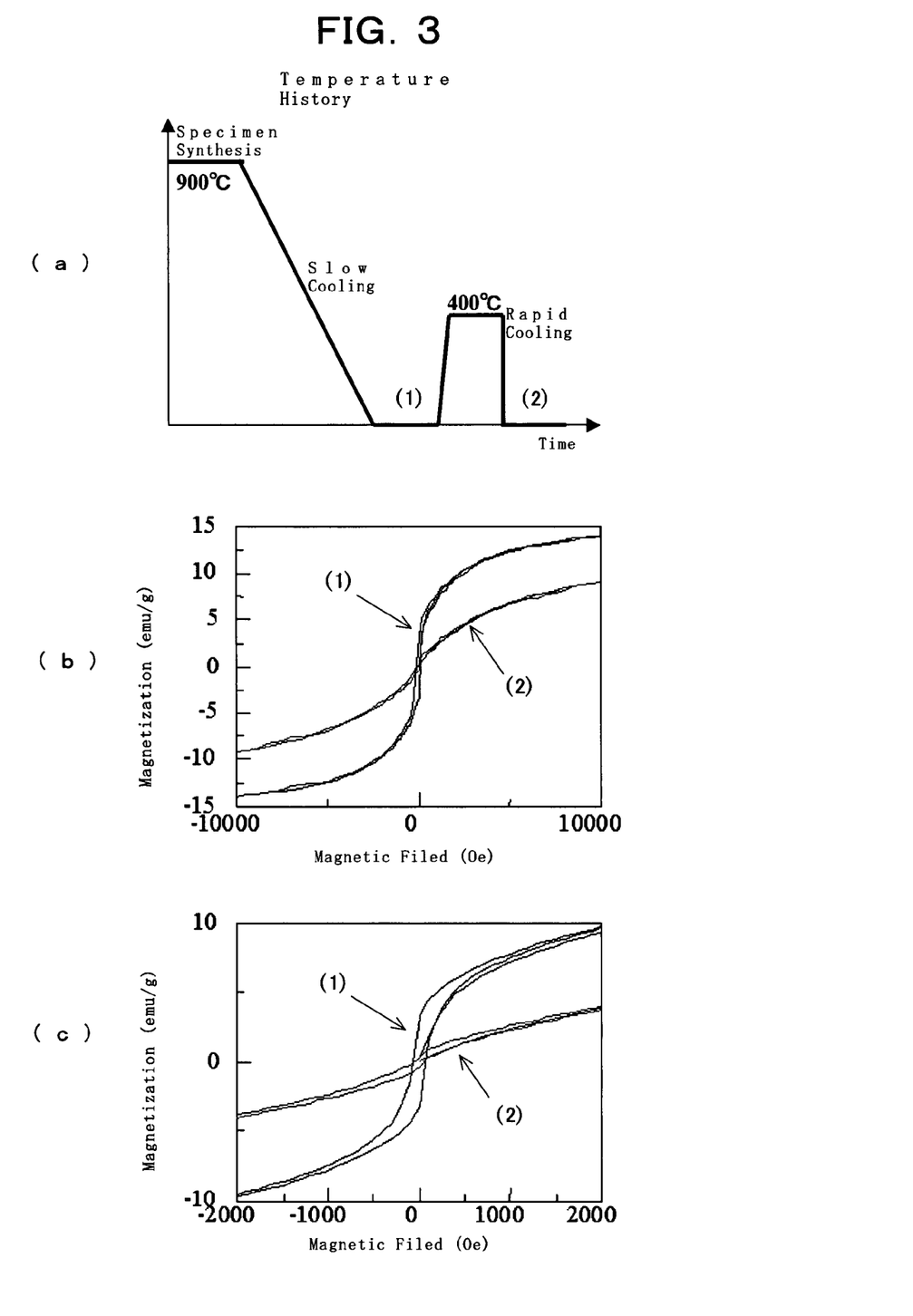
FIG. 3 is a diagram illustrating changes in magnetizing properties of $Fe_{0.92}S$ single crystal as a nonvolatile phase change magnetic material according to the present invention by a temperature history applied thereto.

FIG. 3 shows a diagram and graphs of changes in magnetizing properties of the $Fe_{0.92}S$ polycrystal as a nonvolatile magnetic material of the present invention by temperature histories applied thereto. FIG. 3(a) is the diagram illustrating the temperature histories in which the abscissa axis represents time and the ordinate axis represents temperature of the specimen. In the diagram, a straight line represented by 900° C., which extends horizontally from time 0, corresponds to forming of the sintered body (specimen synthesis), a subsequent straight line of negative gradient indicates slow cooling of the sintered body towards room temperature after the sintering process, a subsequent straight line indicated by (1) on the time axis indicates the specimen at the room temperature after the slow cooling, a subsequent straight line vertical and a straight line represented by 400° C. indicate heating of the specimen to the temperature at which the holes are arranged disorderly, a subsequent vertical straight line indicates rapid quenching to room temperature from the temperature at which the holes in the specimen are arranged disorderly, and a subsequent straight line indicated by (2) on the time axis indicates the specimen at the room temperature after the rapid cooling. Here, the slow cooling was done at a rate of cooling from 900° C. to room temperature for a time period of 10 hours.

FIG. 3(b) is a graph showing magnetizing properties of the specimen (1) after the slow cooling and of the specimen (2) after the rapid cooling in which the abscissa axis represents magnetic field strength and the ordinate axis represents magnetization. FIG. 3(c) is a graph showing the magnetizing properties enlarged in the vicinity of the strength of applied magnetic field of zero. Here, the measurements were all taken at room temperature (300 K).

From FIG. 3, as in FIG. 2 it is seen that the specimen (2) is lower in magnetization than the specimen (1). Noteworthy here is that a hysteresis is found in the magnetization curve of specimen (1) which has a finite spontaneous magnetization under the magnetic field of zero while no hysteresis is found in the specimen (2) whose magnetization becomes zero under the magnetic field of zero. From this, it is seen that there can be distinctively created by the phase exhibiting and the phase not exhibiting spontaneous magnetization by applying different temperature histories thereto in the material.

Here, while a hysteresis though slight is also found in the specimen (2), too, in FIGS. 3(b) and (c), this appears to be due to a slight variation in composition of the polycrystalline specimen. It is seen, however, that the value of magnetization of the rapidly cooled specimen under the magnetic field of zero is much lower than that of the slowly cooled specimen, and controlling the phases by temperature histories can well be made.

Mention is next made of a specific example demonstrating that differences in magnetic properties by states of arrangement of holes can be reversibly controlled, namely that the ferromagnetic and antiferromagnetic phases can be distinctively created reversibly. To this end, a single crystal of $Fe_{0.92}S$ specimen was used.

Figure 4:
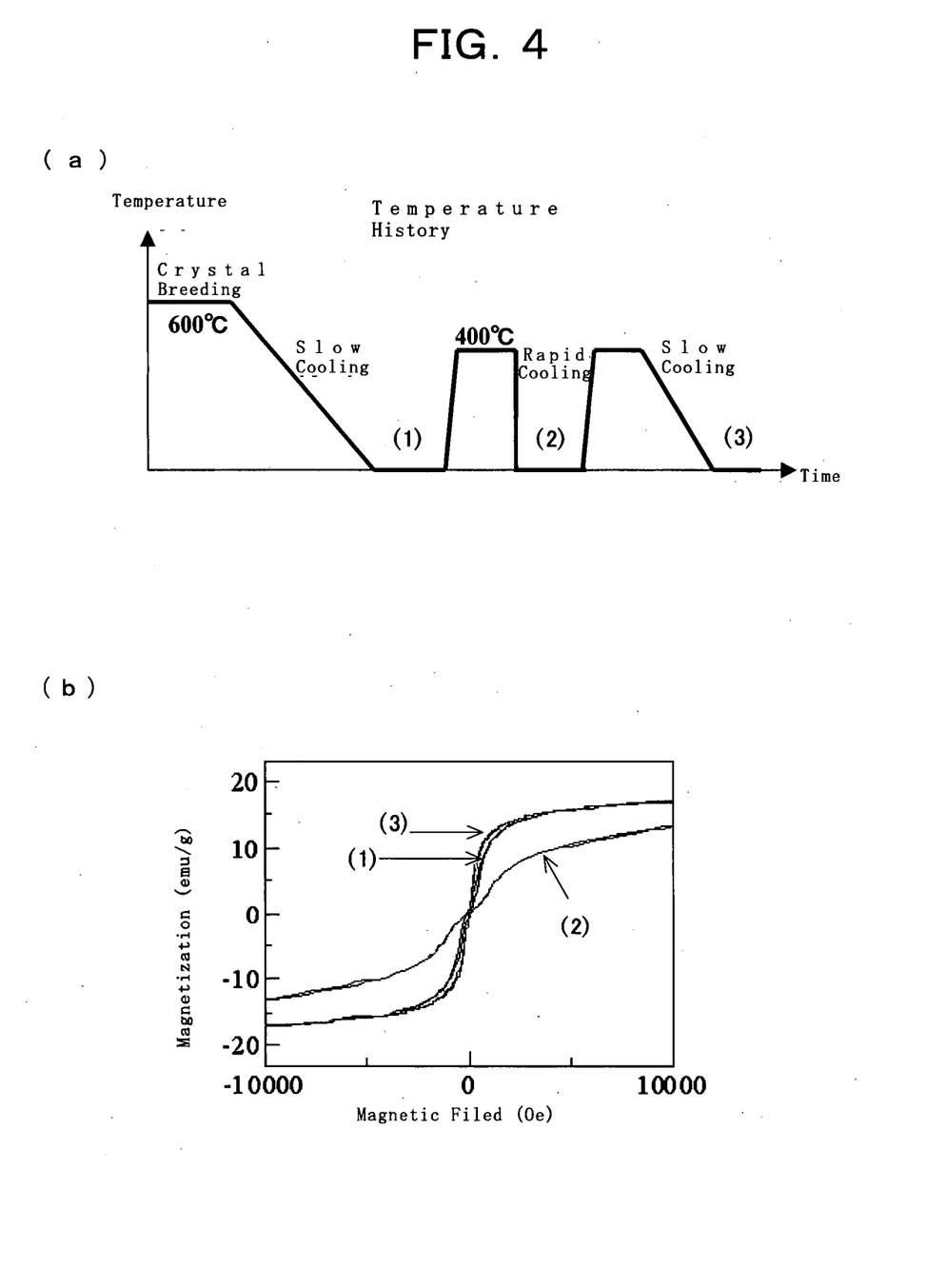
FIG. 4 is a diagram illustrating reversibility of magnetizing properties of $Fe_{0.92}S$ single crystal as a nonvolatile magnetic material according to the present invention.

FIG. 4 shows a diagram and a graph of the reversibility of magnetizing properties of the $Fe_{0.92}S$ single crystal as a nonvolatile magnetic material of the present invention by temperature histories applied thereto. FIG. 4(a) shows the temperature histories in which the abscissa axis represents time and the ordinate axis represents temperature of the specimen. In the diagram, a straight line represented by 600° C., which extends horizontally from time 0, corresponds to the crystal breeding of the specimen, a subsequent straight line of negative gradient indicates slow cooling at a first time of the specimen towards room temperature after the crystal breeding, a subsequent straight line indicated by (1) on the time axis indicates the specimen at the room temperature after the slow cooling, a subsequent straight line vertical and a straight line represented by 400° C. indicate heating at a first time of the specimen to the temperature at which the holes are arranged disorderly, a subsequent vertical straight line indicates rapid quenching to room temperature from the temperature at which the holes in the specimen are arranged disorderly, a subsequent straight line indicated by (2) on the time axis indicates the specimen at the room temperature after the rapid cooling, a subsequent straight line vertical and a straight line represented by 400° C. indicate heating at a second time of the specimen to the temperature at which the holes are arranged disorderly, a subsequent vertical straight line of negative gradient indicates slow cooling at a second time to room temperature from the temperature at which the holes in the specimen are arranged disorderly, and further a subsequent straight line indicated by (3) on the time axis indicates the specimen at the room temperature after the second slow cooling. Here, the slow cooling after the crystal breeding to the room temperature was done as in FIG. 2 and the second slow cooling was done at a rate of cooling from 400° C. to the room temperature for a time period of 3 hours.

FIG. 4(b) shows magnetizing properties of the specimen (1) after the first slow cooling, of the specimen (2) after the rapid heating and cooling and of the specimen (3) after the second heating and slow cooling in which the abscissa axis represents magnetic field strength and the ordinate axis represents magnetization. Here, the magnetic field was applied in a direction in a c-plane and the measurements were all taken at room temperature (300 K).

In FIG. 4(b), in addition to that a differences is found in magnetization curve as in FIG. 2 between the specimen (1) after the first slow cooling and the specimen (2) after the first heating and rapid cooling, the magnetization curve of the specimen (3) after the second heating and slow cooling coincides nearly with that of the specimen (1) after the first slow cooling. To with, it is confirmed that a specimen once rapidly cooled to produce the state that holes are arranged disorderly can be heated to reproduce its original state of hole arrangement. Hereby, it is seen that the ferromagnetic and antiferromagnetic phases can distinctively be created reversibly.

EXAMPLE 2

While the ferromagnetic phase is restored from the antiferromagnetic phase in the above example described in connection with FIG. 4 by slow cooling from 400° C., the ferromagnetic phase can be restored from the antiferromagnetic phase as shown in an example below by applying a temperature history of heating to 270° C. followed by its rapid cooling. Using this temperature history allows writing and erasing on a memory extremely rapidly. A specimen of $Fe_{0.92}S$ single crystal of ferromagnetic phase and a specimen of $Fe_{0.92}S$ polycrystal of ferromagnetic phase were prepared upon being slowly cooled from 400° C. and 900° C., respectively, in the same method as in Example 1. The magnetizing properties of these specimens which after crystal growth were heated to 400° C. followed by their rapid cooling and which then were heated to 270° C. followed by their rapid cooling were measured.

Figure 5:
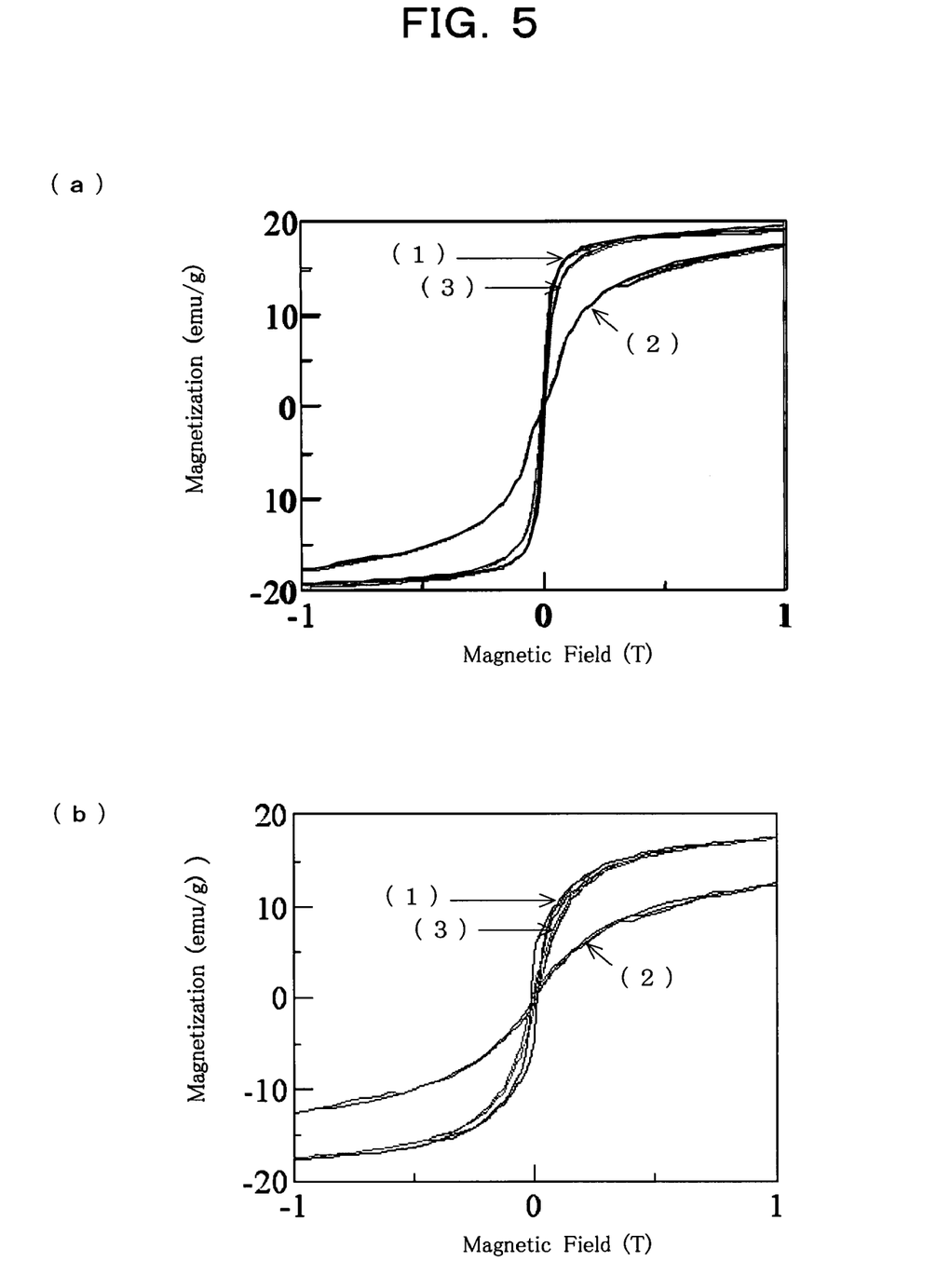
FIG. 5 is a diagram illustrating magnetizing properties of a nonvolatile phase change magnetic material which after its crystal growth is heated to 400° C. and quenched and heated to 270° C. and quenched, respectively.

FIG. 5 shows graphs of magnetizing properties of nonvolatile phase change magnetic materials according to the present invention which after crystal growth are heated to 400° C. followed by their rapid cooling and those of the materials which then are heated to 270° C. followed by their rapid cooling, in which (a) and (b) are for the single crystal and the polycrystal, respectively. In FIGS. 5(a) and 5(b), curves (1), (2) and (3) show magnetizing properties of the specimens after crystal growth, the specimens which after crystal growth were heated to 400° C. followed by their rapid cooling and the specimens which were heated to 400° C. followed by their rapid cooling and then heated to 270° C. followed by their rapid cooling, respectively.

From FIGS. 5(a) and 5(b), it is seen that the specimen after growth, whether it is single or poly crystal, shows magnetizing properties of ferromagnetism having a hysteresis, shows magnetizing properties of antiferromagnetism after it is heated to 400° C. and then rapidly cooled, and restores its original magnetizing properties of ferromagnetism having the hysteresis if it is further heated to 270° C. and then rapidly cooled.

It is thus seen that phase changes from ferromagnetic to antiferromagnetic and from antiferromagnetic to ferromagnetic can both be achieved by heating to a selected temperature followed by rapid cooling.

EXAMPLE 3

Mention is next made of a mechanism for the change from antiferromagnetic to ferromagnetic phase.

A specimen of $Fe_{0.92}S$ single crystal was heated to 400° C. and then rapidly cooled to make an antiferromagnetic phase thereof. And the specimen in the antiferromagnetic phase was heated continuously from the room temperature to 400° C. and its temperature dependence of magnetization was measured. Also, such a specimen was heated and then slowly cooled to make a ferromagnetic phase thereof, and the specimen in the ferromagnetic phase was heated continuously from the room temperature to 400° C. and its temperature dependence of magnetization was measured. The magnetic field applied for measurement had a magnitude of 100 Gausses in a direction of a c-plane.

Figure 6:
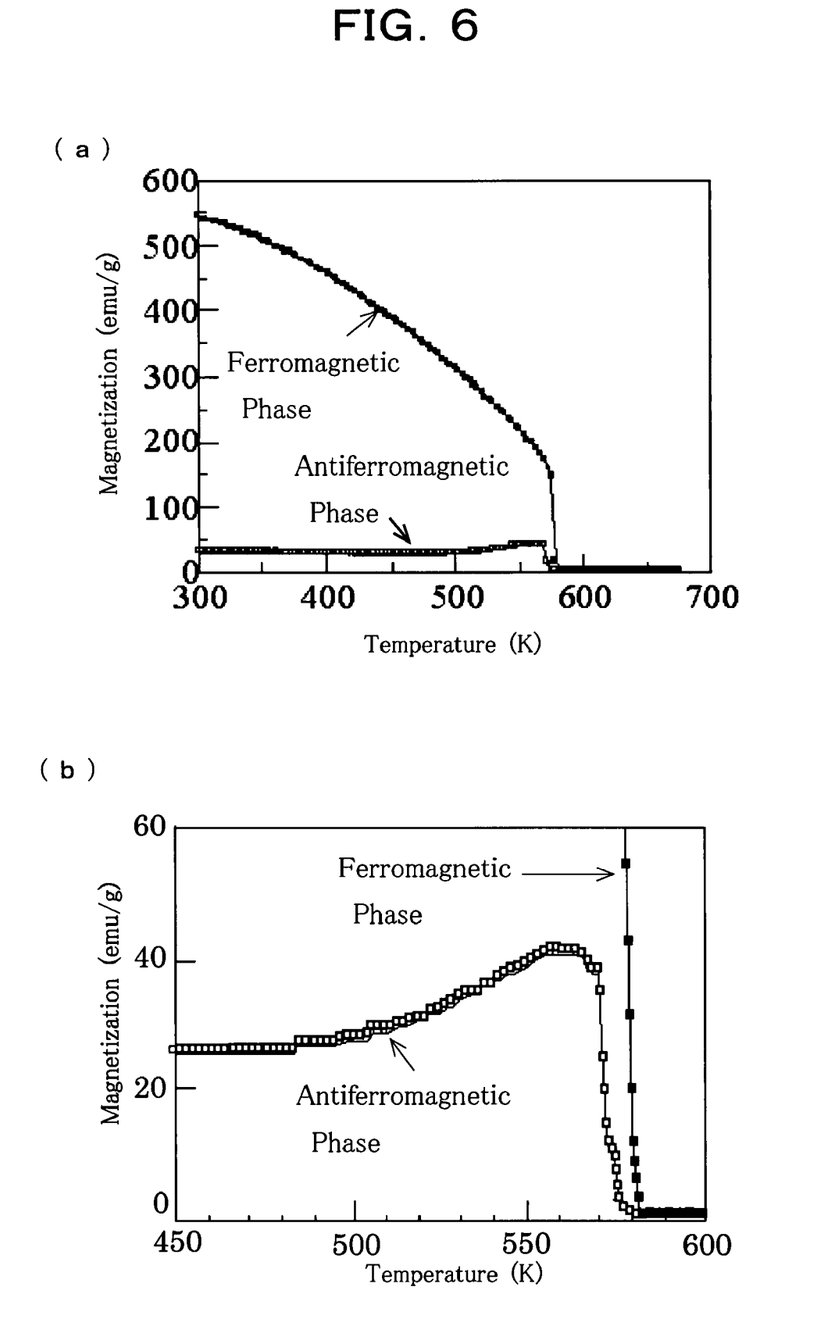
FIG. 6 is a diagram illustrating temperature dependence of magnetization of the antiferromagnetic and ferromagnetic phases of a nonvolatile magnetic material.

FIG. 6 shows graphs of temperature dependences of magnetization of the ferromagnetic and antiferromagnetic phases of the nonvolatile magnetic material according to the present invention. Here, FIG. 6(b) is a graph showing changes in magnetization of the antiferromagnetic phase enlarged in the vicinity of about 270° C. (540 K) in FIG. 6(a).

From FIG. 6(a) it is seen that changes in magnetization of the antiferromagnetic and ferromagnetic phases sharply become zero around 300° C. (570 K) and are substantially zero in a temperature range between about 300° C. (570 K) and 400° C. (673 K). From FIG. 6(b), it is seen also that the magnetization of the antiferromagnetic phase gradually increases from around 230° C. (500 K), becoming the maximum in the vicinity of about 270° C. (540 K).

Those magnetizations of both the antiferromagnetic and ferromagnetic phases become substantially zero in a temperature range higher than about 300° C. (570 K) mean that the ferromagnetic coupling of transition metal atoms in a spin crystallographic c-plane vanishes in this temperature range.

Also, that the magnetization of the antiferromagnetic phase has the maximum around 270° C. (543 K) as shown in FIG. 6(b) means that holes become diffusible in the vicinity of this temperature.

Further, the fact that heating to 270° C. followed by rapid cooling causes the antiferromagnetic phase to return to the ferromagnetic phase signifies that in a temperature range around 270° C., it is lower in free energy in arranging holes that holes are arranged orderly. To with, it is considered that whether holes are arranged orderly and disorderly is determined by the free energy in hole distribution and that while entropy in arrangement of holes is larger when they are arranged disorderly than when they are orderly, due to large repulsive forces such as repulsions by overlap of electron orbits between transition metal atoms, repulsions between spins or coulomb repulsions based on charges that holes possess it is much lower in internal energy when holes are arranged orderly where they are spaced apart, namely where they are distributed in every other layer of c-plane and as a result it becomes to be lower in free energy of hole distribution when holes are arranged orderly.

It is thus considered that heating the antiferromagnetic phase in which the holes are arranged disorderly to a temperature of about 270° C. causes holes to be diffused and rearranged and gives rise to forming the ferromagnetic phase by achieving an orderly arrangement of holes as their stabler state. Accordingly, it is possible to restore the antiferromagnetic phase to the ferromagnetic phase by heating to about 270° C. followed by rapid cooling.

On the other hand, it is considered that at the temperature of 400° C., the free energy of hole distribution has its entropy term more dominant than its internal energy so that the disorderly arrangement greater in entropy is attained. Thus, the temperature of 400° C. is considered to correspond to a temperature at which not only does the ferromagnetic coupling between transition metal atoms in a spins' crystallographic c-plane vanish but also the ordered structure of hole distribution disappears. It should be noted here that the measurements mentioned above were for the specimen of single crystal but are likewise applicable to a specimen of polycrystal.

EXAMPLE 4

Mention is next made of a crystalline transition metal chalcogenide compound according to the present invention when its composition is expressed by formula: $Fe_yS$ and of a range of composition ratio y.

In the same methods as in Example 1, three specimens of $Fe_{0.875}S$, $Fe_{0.92}S$ and $Fe_{0.93}S$ where y had three different values were prepared and their magnetizing properties were measured. Further, these specimens had a temperature history applied thereto of heating to 400° C. followed by their rapid cooling and thereafter their magnetizing properties were measured.

Figure 7:
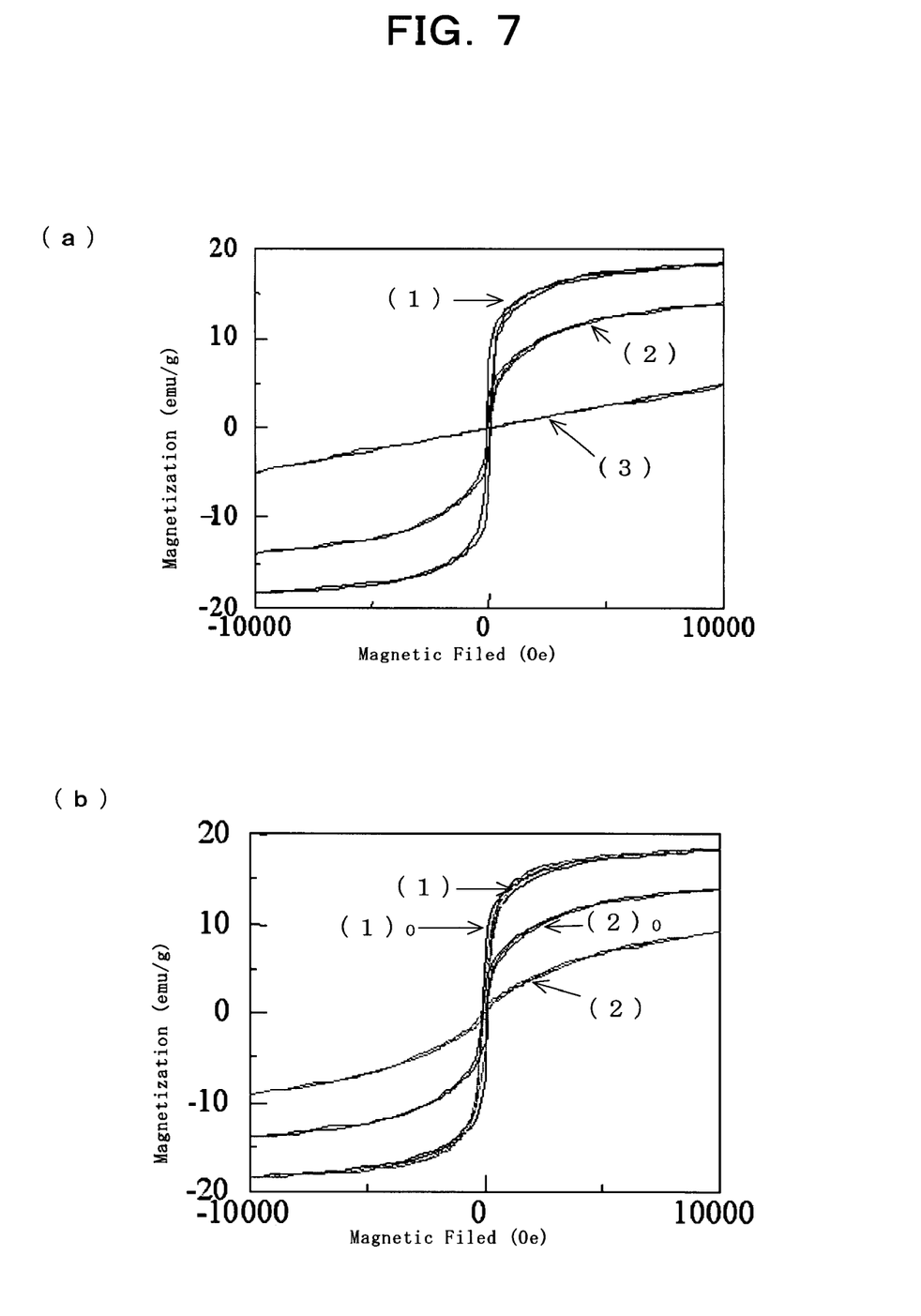
FIG. 7 is a diagram illustrating differences in magnetizing properties of a nonvolatile phase change magnetic material which is a crystalline transition metal chalcogenide compound whose composition is expressed by formula: $Fe_yS$, according to different composition ratios y.

FIG. 7 shows graphs of differences in magnetizing properties of a crystalline transition metal chalcogenide compound as a nonvolatile phase change magnetic material according to the present invention whose composition is expressed by $Fe_yS$ where composition ratio y has different values. FIG. 7(a) shows magnetizing properties of the specimens of $Fe_{0.875}S$, $Fe_{0.92}S$ and $Fe_{0.93}S$ each after crystal growth, which are indicated by curves (1), (2) and (3), respectively. Here, to make the magnetizing properties of $Fe_{0.93}S$ more readily seeable, the ordinate axis is shown as magnified by 100.

FIG. 7(b) shows magnetizing properties of the specimens of $Fe_{0.875}S$ and $Fe_{0.92}S$ having the temperature history applied thereto of heating to 400° C. followed by their rapid cooling, which are indicated by curves (1) and (2), respectively. Here, curves $(1)_0$ and $(2)_0$ indicate magnetizing properties of these specimens, respectively, before the temperature history was applied thereto of heating to 400° C. followed by their rapid cooling and are shown to make clear changes by the temperature history.

From FIG. 7(a) it is seen that $Fe_{0.875}S$ and $Fe_{0.92}S$ exhibit ferromagnetic properties while $Fe_{0.93}S$ exhibits antiferromagnetic properties. From these results it is shown that composition ratio y needs to be lower than 0.93.

From FIG. 7(b) it is seen that $Fe_{0.92}S$ is transformed from the ferromagnetic to antiferromagnetic phase by the temperature history of heating to 400° C. followed by its rapid cooling, but that $Fe_{0.875}S$ is not changed at all by this temperature history.

From these measurement results, it is demonstrated that composition ratio y in a crystalline transition metal chalcogenide compound should have a range: $0.875 < y < 0.93$.

Industrial Applicability

Using a nonvolatile phase change magnetic material according to the present invention, e.g. for a magnetic memory gives rise to characteristic advantages that no need for a rare earth element allows a reduced cost compared with the conventional magneto optical disk material, that being not complex in composition like an amorphous film ensures a prolonged service life, that no need as in an amorphous film to make it amorphous upon rearranging the crystallographic structure over its entire material in a recording region but only requiring the distribution of holes to be altered in recording entails a low consumption of power, that with the transition metal chalcogenide magnetized depending on the state of arrangement of holes, namely upon atomic scale and since it is then in principle possible to write and erase even in a minute region as small as simple lattices, it becomes possible to record at a density higher than with the prior art and that no need for an apparatus for applying a magnetic field makes the device structure extremely simple. Thus, when utilized as a next-generation memory in the field of information industry where there continues to be no end to the demands for the rise in recording density, the material of the present invention is extremely useful.

What is claimed is:

1. A nonvolatile phase change magnetic memory, comprising:
   a substrate; and
   a non-volatile magnetic memory layer on said substrate, the non-volatile magnetic memory layer being made of a crystalline non-stoichiometric transition metal chalcogenide binary compound, which in composition is deficient in transition metal from its stoichiometric ratio composition, wherein the crystalline transition metal chalcogenide binary compound is expressed by formula: $Fe_yS$ and $0.875 < y < 0.93$, thereby having vacancies in transition metal sites,
   wherein said crystalline transition metal chalcogenide compound is structured such that spins of the transition metal atoms in each crystallographic c-plane are ferromagnetically coupled to each other, and spins of the transition metal in each crystallographic c-plane are antiferromagnetically coupled to spins of the transition metal atoms in an adjacent crystallographic c-plane,
   wherein said crystalline transition metal chalcogenide compound has first and second phases: the first phase having an ordered distribution of the vacancies at the transition metal sites such that the c-plane that has the vacancies at the transition metal atom sites occurs periodically in every other c-plane along an c-axis so that said crystalline transition metal compound exhibits ferromagnetism, a second phase thereof having a disordered distribution of the vacancies in the transition metal sites such that the vacancies at the transition metal sites are distributed randomly relative to the first phase so that said crystalline transition metal compound exhibits antiferromagnetism,
   wherein said crystalline transition metal chalcogenide compound in said first phase is transformed to said second phase when a first temperature history is applied thereto, and said crystalline transition metal chalcogenide compound in said second phase is transformed to said first phase when a second temperature history is applied thereto,
   wherein said first temperature history comprises heating the crystalline transition metal chalcogenide compound to a temperature at which said ordered distribution of the vacancies at the transition metal sites vanishes, followed by rapid cooling,
   wherein such second temperature history includes one of first and second sequences, the first sequence comprising heating the crystalline transition metal chalcogenide compound to a temperature at which said vacancies at the transition metal sites diffuse to exhibit said ordered distribution of the vacancies, followed by cooling, the second sequence comprising heating the crystalline transition metal chalcogenide compound to a temperature at which said ordered distribution of the vacancies at the transition metal sites vanishes, followed by cooling said crystalline transition metal chalcogenide compound at such a rate as to produce said ordered distribution of the vacancies at the transition metal sites upon cooling, and
   wherein said non-volatile magnetic memory layer has ferromagnetic portions in which said crystalline transition metal chalcogenide compound is in its first phase, and antiferromagnetic portions in which said crystalline transition metal chalcogenide compound is in its second phase to represent information by a spatial distribution of said ferromagnetic portions and said antiferromagnetic portions.

2. The nonvolatile phase change magnetic memory as set forth in claim 1,
   wherein said non-volatile magnetic memory layer is configured such that when no information is stored, the crystalline transition metal chalcogenide of said non-volatile magnetic memory layer is in its first phase on a substantially entire surface, exhibiting ferromagnetism on the entire surface, and such that information can be stored on said non-volatile magnetic memory layer by selectively creating antiferromagnetic portions by local irradiation of a laser beam, and
   wherein said non-volatile magnetic memory layer is configured such that the information stored in said non-volatile magnetic memory layer can be read out by an electromagnetic effect, and such that the information stored in said non-volatile magnetic memory layer can be erased by radiating a laser pulse onto said non-volatile magnetic memory layer in such a way as to generate the second temperature history to convert the antiferromagnetic portions to ferromagnetic portions.

3. The nonvolatile phase change magnetic memory as set forth in claim 1,
   wherein said non-volatile magnetic memory layer is configured such that when no information is stored, the crystalline transition metal chalcogenide of said non-volatile magnetic memory layer is in its second phase on a substantially entire surface, exhibiting antiferromagnetism on the entire surface, and such that information can be stored on said non-volatile magnetic memory layer by selectively creating ferromagnetic portions by local irradiation of a laser beam, and
   wherein said non-volatile magnetic memory layer is configured such that the information stored in said non-volatile magnetic memory layer can be read out using an electromagnetic effect, and such that the information stored in said non-volatile magnetic memory layer can be erased by radiating a laser pulse onto said non-volatile magnetic memory layer in such a way as to generate the first temperature history to convert the ferromagnetic portions to antiferromagnetic portions.

4. The nonvolatile phase change magnetic memory as set forth in claim 2 or 3, wherein said non-volatile magnetic memory layer is configured such that the information stored on said non-volatile magnetic memory layer can be read from the film by the Kerr effect or Faraday effect on a laser beam directed to and reflect from said non-volatile magnetic memory layer.

5. The nonvolatile phase change magnetic memory as set forth in claim 2 or 3, wherein said non-volatile magnetic memory layer is configured such that the information stored on said non-volatile magnetic memory layer can be read from the film by detecting a magnetroresistance.

* * * * *